United States Patent
Takeuchi et al.

(10) Patent No.: US 6,639,616 B2
(45) Date of Patent: Oct. 28, 2003

(54) IMAGE FORMING APPARATUS AND IMAGE FORMING METHOD FEATURING IMAGE FORMATION IN TWO, DIFFERENT-SPEED MODES

(75) Inventors: Akihiko Takeuchi, Shizuoka (JP); Naoki Enomoto, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/025,560

(22) Filed: Dec. 26, 2001

(65) Prior Publication Data

US 2002/0085082 A1 Jul. 4, 2002

(30) Foreign Application Priority Data

Dec. 27, 2000 (JP) ........................................ 2000-397322

(51) Int. Cl.$^7$ .................. G03G 15/00; G03G 15/01; G03G 15/04
(52) U.S. Cl. .................. 347/115; 347/232; 347/243; 349/45
(58) Field of Search .................. 347/115, 129, 347/232, 243, 260, 261; 399/45, 68

(56) References Cited

U.S. PATENT DOCUMENTS 4,030,445 A    6/1977  Takenaga et al. ........... 118/645
6,038,423 A  * 3/2000  Tagawa et al. ............. 399/302
6,188,419 B1 * 2/2001  Katamoto et al. .......... 347/129

FOREIGN PATENT DOCUMENTS

| DE | 26 07 727    |   | 2/1976  |
| JP | 50-50935     |   | 5/1975  |
| JP | 4-166854  A  | * | 6/1992  |
| JP | 2001-324900 A | * | 11/2001 |

* cited by examiner

Primary Examiner—Joan Pendegrass
(74) Attorney, Agent, or Firm—Fitzpatrick, Cella, Harper & Scinto (57) ABSTRACT

An image forming apparatus is provided with photosensitive drums for forming latent images by irradiation of light reflected by a polygon mirror and a fixing device for fixing toner images corresponding to the latent images on a sheet material. Deterioration of an image to be formed is prevented if reflective surfaces of a reflective polyhedron are thinned out in reducing a process speed of image formation. This apparatus is further provided with a control unit for, if the number of surfaces of the polygon mirror is m (where m is an integer of three or more), performing a control for selecting n such that m/(n+1) is not an integer as a relation between m and n and performing a control for making n surfaces unused as a reflective surface of light among continuous n+1 surfaces of the reflective polyhedron in decelerating the image forming process.

8 Claims, 7 Drawing Sheets

IMAGE FORMING APPARATUS AND IMAGE FORMING METHOD FEATURING IMAGE FORMATION IN TWO, DIFFERENT-SPEED MODES

BACKGROUND OF THE INVENTION

1. Field of the Invention

The present invention relates to an image forming apparatus such as a copying machine and a printer. More specifically, the present invention relates to an image forming method that is applied to the apparatus and relates to an apparatus for performing image formation by converting light to scanning light using a reflective polyhedron.

2. Description of the Related Art

Conventionally, there have been known two methods as an image forming method for obtaining a color image on a sheet material by superimposing toner images of a plurality of colors. One is a method of forming electrostatic latent images on an image bearing member, sequentially developing them by toner to transfer them to a sheet material each time they are developed and superimposing toner images of a plurality of colors on the sheet material (hereinafter referred to as multiple transfer method). The other is a method of superimposing toner images of a plurality of colors on an image bearing member or an intermediate transfer member and transferring the superimposed toner images of a plurality of colors collectively to a sheet material (hereinafter referred to intermediate transfer method).

Among them, the former method is put to practical use with structures described in DE2607727, Japanese Patent Application Laid-open No. Sho 50-50935 and the like.

On the other hand, the latter method is a technology having advantages such as a simple structure and currently drawing attention, although it has problems of color mixture at the time of development and image deterioration at the time of re-transfer.

Moreover, in recent years, a so-called tandem type multiple transfer method, which is capable of forming a full color image using one path by providing process units such as a photosensitive member and a developing device independently for each color, begins to draw attention in terms of high-speed productivity.

Figure 8:
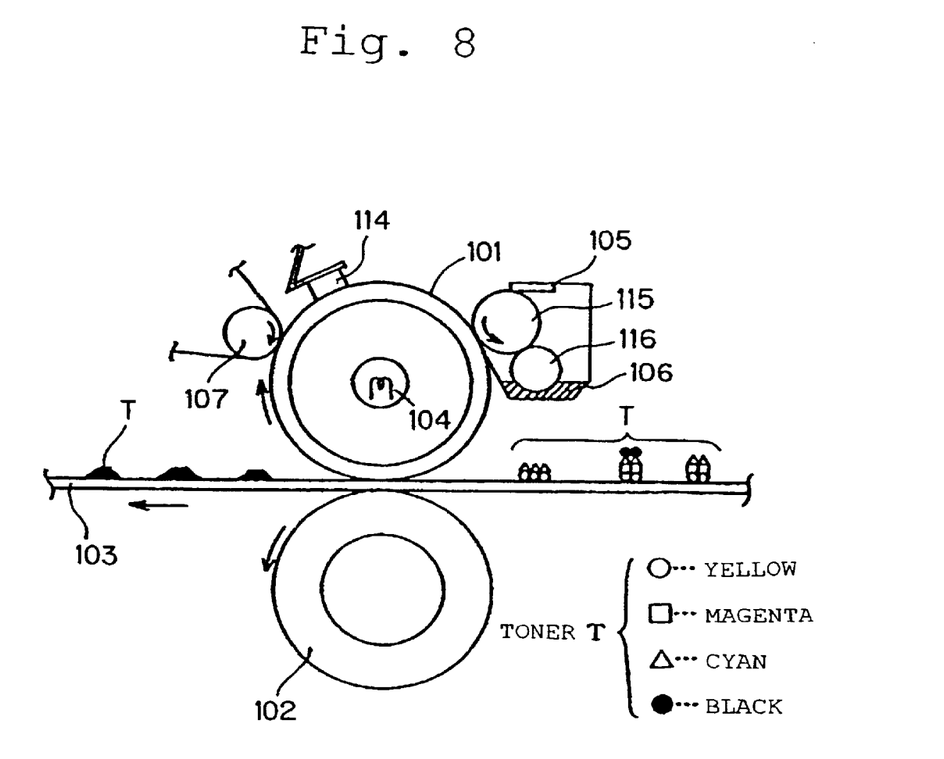
FIG. 8 is a schematic view of a fixing device to be used in the conventional image forming apparatus.

In any of the methods, toner images T of a plurality of colors formed and superimposed on a sheet material 103 are finally heated and fixed by a fixing device that uses a roller or a belt as shown in FIG. 8. As a result, toner images of each color are mixed and a full color image can be obtained. FIG. 8 is a schematic view of a fixing device that is used in the conventional image forming apparatus.

An example of a fixing device of this type by a heat roller method will be hereinafter described with reference to FIG. 8. In FIG. 8, a fixing roller 101 is for melting to fix the toner T on the sheet material 103 by heating and application of pressure. A pressure roller 102, which is disposed opposing the fixing roller 101, is for applying pressure to the fixing roller 101.

Usually, the fixing roller 101 often has a structure to be heated by a heater 104 such as a halogen lamp from the inside of the roller.

Therefore, it is a general practice to monitor a surface temperature of the fixing roller 101 by a temperature sensing element 114 such as a thermistor to on/off control the heater 104, thereby performing temperature control.

In addition, as the toner T, toner of four colors of yellow, cyan, magenta and black is generally used.

In this case, silicone oil 106 or the like is applied to the surface of the fixing roller 101 by a blade 105 via a drawing roller 116 and an applying roller 115 in order to prevent offset. Alternatively, toner originally containing wax or oil component is used to prevent offset.

In addition, the surface of the fixing roller 101 may be cleaned by a cleaning web 107 or the like, if necessary.

Incidentally, in the case in which a transparent film for an over-head projector (hereinafter referred to as OHP (over-head projector) sheet), a sheet for realizing high gloss (hereinafter referred to as high gloss paper or high gloss sheet) or the like is used, a method of giving it a heat quantity larger than that required for fixing an image on a normal transfer sheet to perform fixing and realizing desired transparency and glossiness is often used.

As a method for this purpose, for example, it is possible to increase a heat value of the heater 104 incorporated in the fixing roller 101. However, with this method, a sufficient heat quantity is not obtained in many cases and it takes long to make a temperature of the fixing roller 101 follow. Thus, this method cannot always be effective.

As another method, there is a method of reducing a fixing speed by the fixing roller 101 to give a sufficient heat quantity to a sheet. With this method, a desired heat quantity is easily obtained and, at the same time, it is possible to execute fixing immediately without providing a waiting time because it is unnecessary to change a temperature setting of the fixing roller 101 itself.

However, if reduction in a fixing speed is attempted as described above, a sheet exists on a transfer portion and a fixing portion simultaneously unless a distance between the transfer unit and the fixing unit is sufficiently large as compared with a maximum sheet length of a sheet to be used (in case of an intermediate transfer member, unless a distance between a primary transfer unit and a secondary transfer unit is sufficiently large as compared with the maximum sheet length) in case of the above-mentioned multiple transfer method.

Consequently, a fixing speed cannot be reduced after toner images of final colors are formed on a photosensitive member until all toner images are transferred to the sheet.

That is, it has become necessary to additionally rotate a transfer drum or an intermediate transfer member. In this case, a printing time is substantially extended Moreover, in recent years, a so-called quadruple multiple transfer method using photosensitive members for four colors draws attention as a high-speed full color printing method. In this method, decelerated fixing cannot be performed with a machine in which a distance between portions for transferring and fixing final color is shorter than a maximum sheet length unless the machine is put in a decelerated state in advance from the time when an image is formed on a photosensitive member. (It is needless to mention that, in the above-mentioned multiple transfer or intermediate transfer member method, it is also possible to perform the same method as described below instead of rotating the transfer drum or the intermediate transfer member additionally.)

That is, in an image forming apparatus with a short distance between a transfer unit and a fixing unit, it becomes necessary to perform image formation in a decelerated state in advance in order to avoid shock caused by reducing a fixing speed during image formation.

Nevertheless, the applicants and the like found, as a result of examining a laser printer of a method of deflecting a laser beam irradiated from a light source by a reflective polyhedron (e.g., polygon mirror) to scan a member to be scanned such as a photosensitive member by the deflected laser beam, that a laser beam quantity became excessive and deficiencies such as tendency of image block-up and defective middle tones were caused if image formation is performed in a decelerated state (e.g., at a half speed of a standard speed) in the laser printer.

Thus, it became necessary to reduce a laser beam quantity in the decelerated state. However, it was difficult to steadily realize a significant change of a light amount such as reducing it to half or one third as in this example using a laser beam emitting circuit.

In addition, it took long to change a speed of a polygon mirror and a process speed could not be changed promptly.

There is known a method of making predetermined surface unused among all surfaces of a polygon mirror instead of reduction of a laser beam quantity.

This method is a so-called thinning-out scanning for thinning out the number of surfaces to be used of a polygon mirror to use them and substantially reducing a laser beam quantity, which is recognized as a publicly-known technology. Further, thinning out one surface of reflective surfaces of a polygon mirror means that a reflective surface skipped one surface from a reflective surface used for optical scanning is used for the next optical scanning.

However, when the applicants or the like performed this thinning-out scanning, a new problem concerning an image occurred.

The problem is that dispersion of scanning lengths in the main scanning direction that each surface of a polygon mirror has with respect to an image having periodicity such as a dither image, so-called jitter, causes interference and fringe-like streak unevenness occurs on, for example, uniform images of middle tones.

Figure 4:
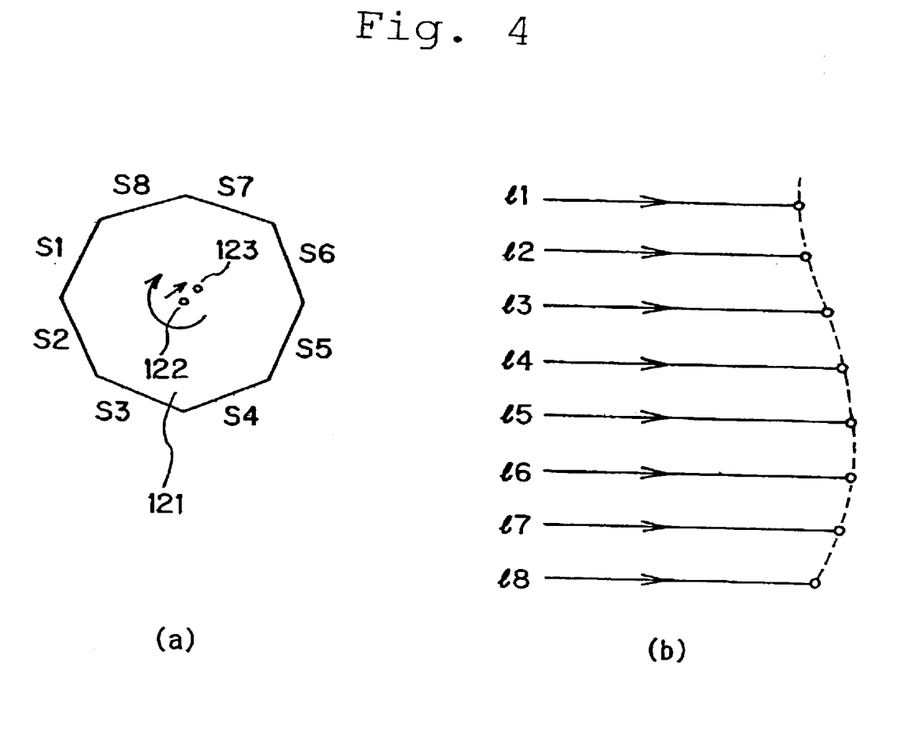
FIG. 4 is a schematic view showing a relation between a structure of a polygon mirror to be used in the conventional image forming apparatus and scanning lengths.
Figure 5:
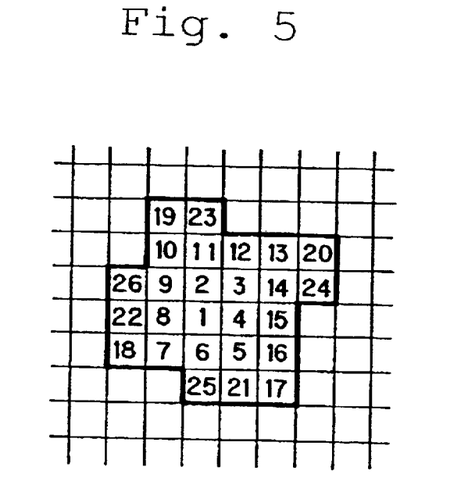
FIG. 5 is a conceptual view showing a dither matrix to be used in the conventional image forming apparatus.
Figure 6:
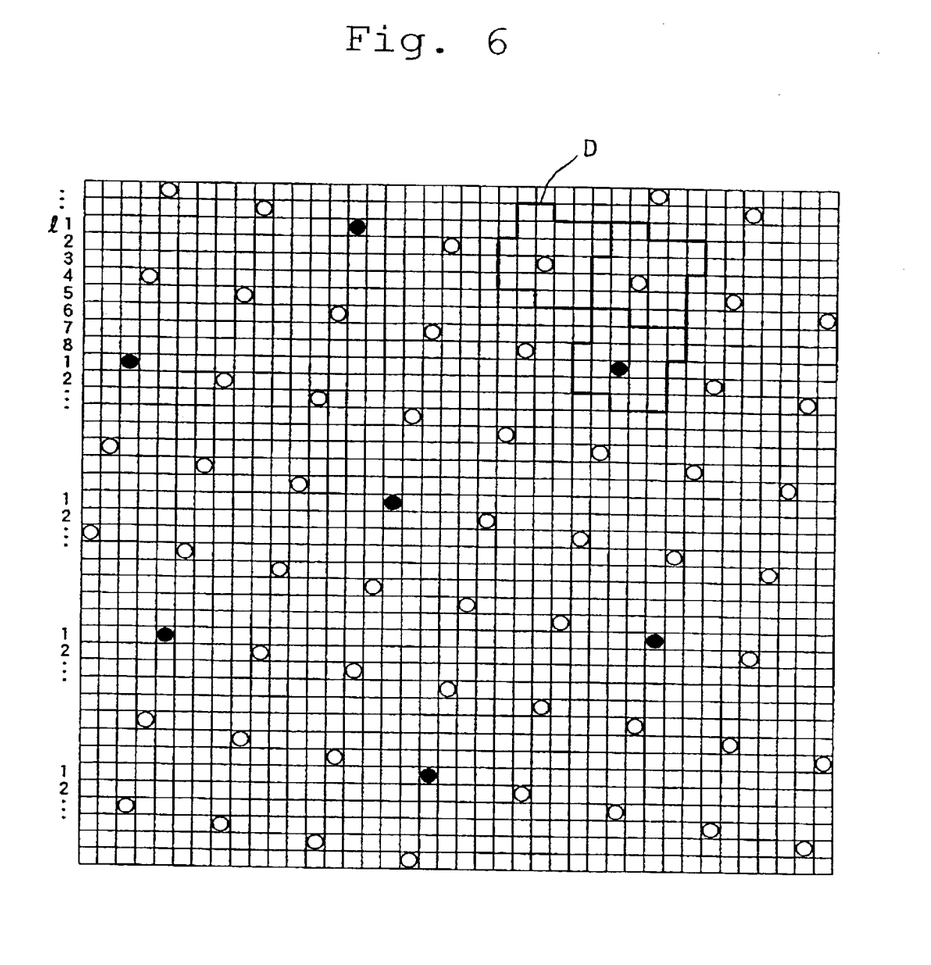
FIG. 6 is a schematic view showing an image pattern to be formed in the conventional image forming apparatus.
Figure 7:
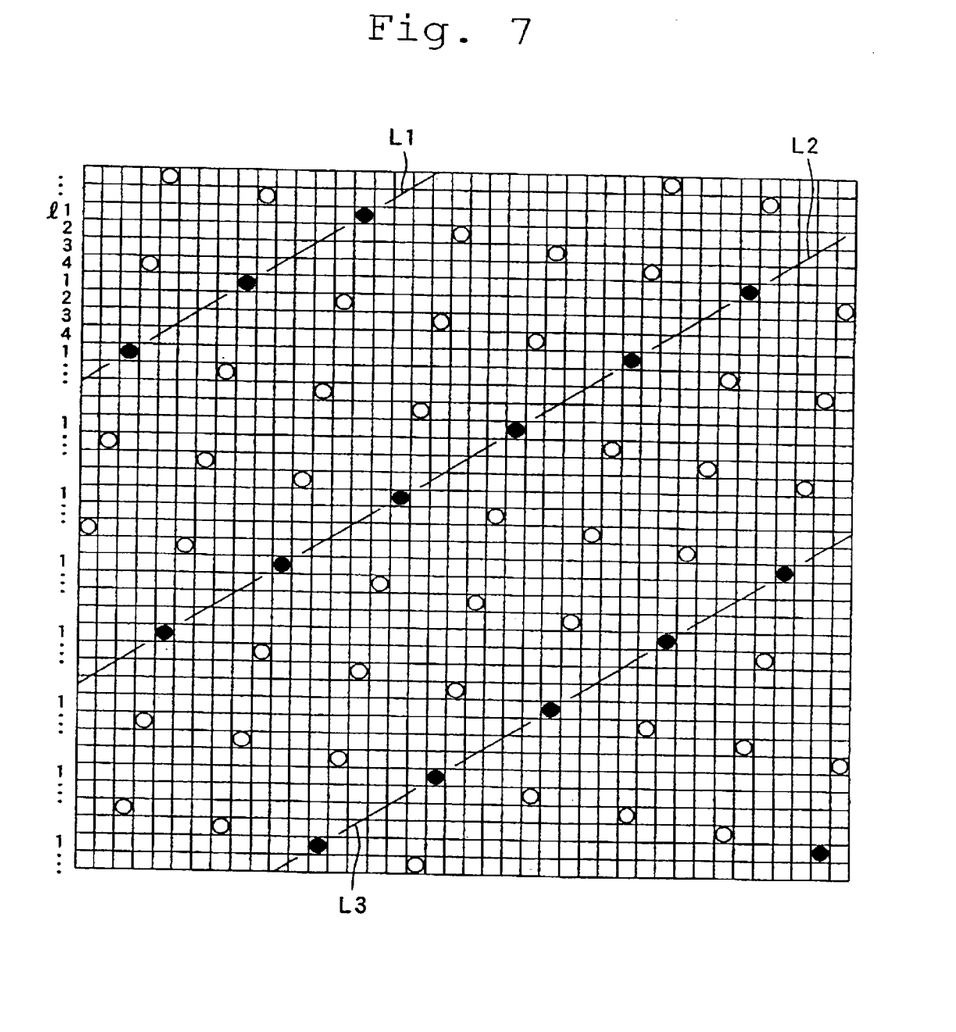
FIG. 7 is a schematic view showing an image pattern to be formed in the conventional image forming apparatus.

This moiré phenomenon will be described with reference to FIGS. 4 to 7. FIG. 4 is a schematic view showing a relation between a structure of a polygon mirror to be used in the conventional image forming apparatus and scanning lengths. FIG. 5 is a conceptual view showing a dither matrix to be used in the conventional image forming apparatus. FIGS. 6 and 7 are schematic views showing image patterns to be formed in the conventional image forming apparatus.

As an example, the case in which a polygon mirror 121 has eight surfaces as shown in FIG. 4A will be described.

If a rotating shaft 123 of the mirror deviates with respect to a central position 122, influence in the main scanning direction appears as a infinitesimal deviation (undulation) of a scanning position from left to right of FIG. 4B as shown by scanning lines 11 to 18 corresponding to mirror surfaces S1 to S8 of FIG. 4B.

Here, starting positions for starting writing in the left end are aligned by synchronizing writing signals by known detecting means. However, in accordance with the rightward scanning, deviation of positions occurs for each surface of the polygon mirror, which becomes maximum in the right end.

That is, as the scanning moves from the left end to the right end, dots gradually deviate and the eight ends of the scanning undulate to left and right at a period of every eight scanning lines.

On the other hand, as an example of an image pattern, various dither matrix as shown in FIG. 5 are assumed and pixels are grown in an order indicated by numerical values (i.e., grown in a swirling shape outward from the center).

In this case, in printers of recent years, a so-called multiple value dither for further dividing the inside of one dot in the figure into a plurality of steps to grow pixels may be used.

In any case, when such a repeating pattern is used, growth centers as shown in FIG. 6 (represented by white circles or black circles) appear on a bit map.

Here, a few dither matrixes D based on the growth centers (represented by white circles or black circles) are shown as an example in FIG. 6.

When undulation of a beam position appearing at a period of every eight scanning lines due to the above-mentioned deviation of polygon surfaces is caused in this example, sparse parts and dense parts appear at a period of every eight scanning lines with approaching the right end on the image. Then, for example, the part of the black growth center corresponding to the scanning line 11 is enhanced in FIG. 6 (looks slightly darker than the other growth centers).

The parts of the black circles shown in FIG. 6 look black because the part with less vertical deviation has a closer distance between upper and lower dots than the other parts due to undulation in image formation of the polygon mirror shown in FIG. 4.

In other words, it can be said that the parts of the white circles of FIG. 6 are parts in which a distance between upper and lower dots was expanded (in a slant direction) at the time of image formation due to the undulation of the polygon mirror shown in FIG. 4 and the dots became sparse, as a result, the entire pixel relatively looks light.

It seems that the pixels look dark when each dot is concentrated and look light when each dot is dispersed because an amount of toner or a shape of a toner image is affected by a change of a depth of potential at the time of latent image formation by the electrophotographic system or an edge effect at the time of development.

In any case, shades of a pixel are caused by undulation in the main scanning direction by a polygon mirror of FIG. 4 and the shades occur at a period of this undulation.

However, as in this example, if the period of undulation (here, period of eight lines) is large as compared with a size of a dither matrix, since a distance between dots to be enhanced expands and neighboring enhanced dots do not look connected, a moiré pattern is rarely discerned on an image.

Nevertheless, when thinning-out scanning of a polygon mirror following reduction in an image forming speed as described above is performed, for example, if every other surface of a polygon mirror is used as the image forming speed is reduced to half, the above-mentioned undulation appears at a period of four scanning lines corresponding to half of the eight surfaces.

FIG. 7 shows how interference between a dither growth center and undulation occurs in this case. In FIG. 7, white circles and black circles are also centers of the dither matrixes shown in FIG. 5. That is, in FIG. 7, the white circles and the black circles are also centers of the dither matrixes D shown in FIG. 6.

As is evident from FIG. 7, as the period of undulation is reduced to four scanning lines, a distance between dots to be enhanced is narrowed and strong correlation as shown by L1 to L3 (i.e., a slant fringe pattern due to moiré) is caused.

A degree of this moiré fringe pattern changes according to a magnitude of undulation of scanning by a polygon mirror, a scanning density for one dot, a shape of dither and the like. As an example, it was found that, when the scanning density was set to 600 dots/inch (in this case, a pixel by the above-mentioned dither was equivalent to approximately 120 lines), an interference fringe in the right end of the scanning by the polygon mirror was a slant line with a pitch of approximately 0.6 mm and, then, even if a manufacturing accuracy of a polygon mirror and a rotating shaft was increased to suppress a difference between a maximum value and a minimum value of an amount of deviation of dots in the main scanning direction causing undulation to be equal to or less than 1 dot, a moiré fringe at the time of thinning-out scanning due to deceleration was very conspicuous.

On the other hand, it was found that it was difficult in terms of manufacturing accuracy to reduce undulation caused by a polygon mirror to a degree at which a moiré fringe was not seen (e.g., ⅕ dot or less in the right end).

Further, this moiré fringe pattern tends to be conspicuous when a size of a dither (the number of dots in one side) and the number of surfaces of a polygon mirror are close. Since the number of lines of a dither that is often used in general is 100 to 200 (i.e., the number of dots in one side is 6 to 3 dots) and, on the other hand, a polygon mirror with four to twelve surfaces is often used, if polygon mirror surface is thinned out and used as described above, the moiré fringe pattern changes to be conspicuous.

SUMMARY OF THE INVENTION

The present invention has been devised in view of the above and other drawbacks, and it is an object of the present invention to provide an image forming apparatus and an image forming method that are capable of preventing decrease in a quality of an image to be formed even if reflective surfaces of a reflective polyhedron are thinned out in reducing an image forming speed.

Another object of the present invention is to provide an image forming apparatus comprising: a movable image bearing member; a light source; a rotatable reflective polyhedron for reflecting light from said light source and optically scanning said image bearing member; a first mode for forming an image on said image bearing member at a first speed; and a second mode for forming an image on said image bearing member at a speed of $1/(n+1)$ of the first speed, and when it is assumed that the number of surfaces of said reflective polyhedron is m, $m/(n+1)$ is not an integer at the time of said second mode (provided that m is an integer of three or more and n is a natural number).

Still another object of the present invention is to provide an image forming method comprising the steps of: switching from a first mode for forming an image on an image bearing member at a first speed to a second mode for forming an image on an image bearing member at a speed smaller than the first speed; and using reflective surfaces of a reflective polyhedron, in which the number of rotatable surfaces is m, for reflecting light from a light source and optically scanning an image bearing member by skipping n surfaces such that $m/(n+1)$ does not make an integer (provided that m is an integer of three or more and n is a natural number).

Further objects of the present invention will become apparent from the following explanation.

DETAILED DESCRIPTION OF THE PREFERRED EMBODIMENTS

Preferred embodiments of the present invention will be hereinafter described in detail with reference to the accompanying drawings. Further, dimensions, materials and shapes of components and their relative arrangements described in the embodiments are not intended to limit the scope of the present invention to them unless specifically described otherwise.

In addition, in the accompanying drawings, like reference numerals designate the same or similar parts throughout the figures thereof.

[First Embodiment]

Figure 1:
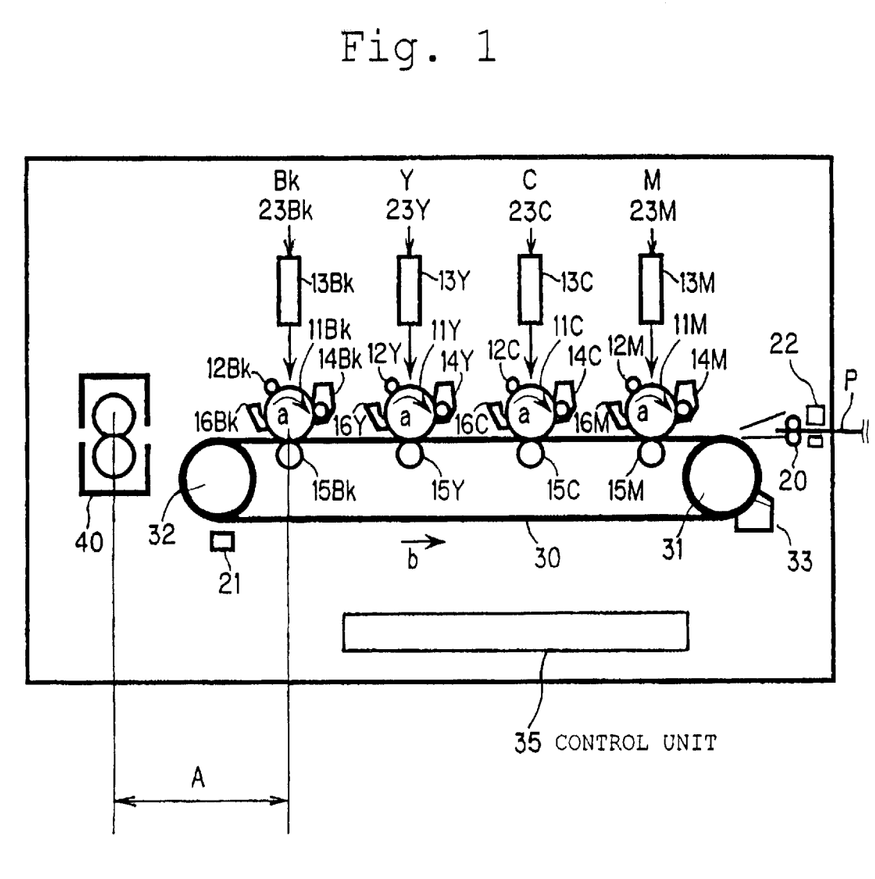
FIG. 1 is a sectional view of a full color image forming apparatus of a four-drum system of an electrophotographic method that is a first embodiment of an image forming apparatus in accordance with the present invention.

First, a first embodiment of an image forming apparatus in accordance with the present invention will be described with reference to FIGS. 1 and 2. FIG. 1 is a sectional view of a full color image forming apparatus of a four-drum system of an electrophotographic system that is a first embodiment of an image forming apparatus in accordance with the present invention.

The image forming apparatus shown in FIG. 1 has a plurality of image forming units M, C, Y and Bk and is provided with a transfer belt 30, which is disposed traversing each image forming unit, as conveying means for conveying a recording material.

Cylindrical photosensitive drums (photosensitive members) 11M, 11C, 11Y and 11Bk as movable image bearing members are supported rotatably in an arrow a direction on the image forming units M, C, Y and Bk, respectively. Reference numerals 12M, 12C, 12Y and 12Bk denote primary charger, which are disposed a predetermined distance apart from the photosensitive drums 11M, 11C, 11Y and 11Bk, respectively.

Reference numerals 13M, 13C, 13Y and 13Bk denote laser exposure devices as exposing means having a light source and a polygon mirror as a reflective polyhedron which is rotatable for reflecting light from the light source to optically scan an image bearing member. The laser exposure devices 13M, 13C, 13Y and 13Bk expose the photosensitive drums 11M, 11C, 11Y and 11Bk according to image signals 23M, 23C, 23Y and 23Bk downstream in the rotating direction of the photosensitive drums with respect to the primary chargers 12M, 12C, 12Y and 12Bk, respectively.

Reference numerals 14M, 14C, 14Y and 14Bk denote developing devices containing toner of magenta, cyan, yellow and black, respectively, which are disposed opposing the photosensitive drums 11M, 11C, 11Y and 11Bk further downstream than the exposure devices of the photosensitive drums.

Reference numeral 30 denotes a transfer belt for carrying a sheet material P that is a recording material supplied from a registration roller 20. The transfer belt 30 is stretched and suspended (a state in which it is suspended while being applied tension) by a driving roller 31 and a separation roller 32 and is driven in an arrow b direction contacting the photosensitive drums 11M, 11C, 11Y and 11Bk.

Transfer chargers 15M, 15C, 15Y and 15Bk are disposed in each transfer position against each of the photosensitive drums 11M, 11C, 11Y and 11Bk from the upstream in the moving direction of the transfer belt 30 so as to nip the transfer belt 30 between respective transfer chargers and photosensitive drums.

Cleaners 16M, 16C, 16Y and 16Bk are cleaners for removing residual toner on each of the photosensitive drums 11M, 11C, 11Y and 11Bk and belt cleaner 33 is a belt cleaner for cleaning the transfer belt 30.

A fixing device 40 is fixing means for fixing a toner image on the sheet material P to which the toner image is transferred.

A control unit 35 is control means for controlling operations of the entire image forming apparatus and controls operations of the photosensitive drums 11M, 11C, 11Y and 11Bk, the laser exposure devices 13M, 13C, 13Y and 13Bk, the fixing device 40 and the like.

Operations of the image forming apparatus configured as described above will be described with an image forming unit M as an example.

The photosensitive drum 11M has an optical semiconductive layer on a surface of a conductive base such as aluminum and rotates in the arrow a direction.

The photosensitive drum 11M is negatively charged on its surface uniformly by the primary charger 12M and, then, subject to exposure by the laser exposure device 13M, whereby an electrostatic latent image corresponding to image data is formed.

The exposure by the laser exposure device 13M is performed using a polygon mirror as described later.

The developing device 14M performs development using toner that is negatively charged and forms a toner image corresponding to the electrostatic latent image on the surface of the photosensitive drum 11M.

Then, the toner image formed on the surface of the photosensitive drum 11M is transferred to the sheet material P, which is supplied toward the transfer belt 30 from the registration roller 20 in synchronous with the toner image being formed, by the transfer roller 15M.

On the other hand, the photosensitive drum 11M after the toner image is transferred therefrom has residual toner attached to the surface thereon, which is removed by the cleaner 16M and the next image is formed thereon.

The above-mentioned operations are performed in each image forming unit at predetermined timing and toner images formed on each photosensitive drum are transferred to the sheet material P held by the transfer belt 30 one after another.

In the case of a full color mode, toner is transferred to the sheet material P in the order of M, C, Y and Bk. In the case of a single color mode or a two or three color mode, toner of necessary colors multiply transferred to the sheet material P in the above-described order in the same way.

The sheet material P to which toner images are transferred is supplied to the fixing device 40 by the transfer belt 30 and is subject to heating and application of pressure to be fixed, whereby a full color image is obtained.

Further, the transfer belt 30 that has finished supplying the sheet material P to the fixing device 40 has its surface cleaned by the belt cleaner 33.

In such an apparatus as described above, when a distance A from a fixing nip to a transfer nip of the fourth color is shorter than a sheet material, if a sheet material such as an OHP sheet, high gloss paper (high gloss sheet) or cardboard is used instead of plain paper, it is preferable to reduce a speed itself of an image forming process of the first color in advance to be slower than a speed (first speed) of a standard image forming process (first image forming mode) to have a speed (second speed) of a deceleration image forming process (second image forming mode) as a fixing speed is reduced to half or one third in order to secure transparency, glossiness, fixing property and the like. That is, if the fixing speed is reduced in the second mode to half of the fixing speed in the first mode, both speeds of an image bearing member and fixing means are reduced to half of the speeds in the first mode.

In this case, if the fixing speed is reduced to half using a polygon mirror of eight surfaces or is reduced to one third using a polygon mirror of six surfaces, an interference fringe tends to occur between the polygon mirror and a pixel such as a dither as described in the section of the conventional art. In order to solve this problem, in this embodiment, polygon mirrors of seven surfaces are used for all the laser exposure devices 13Bk, 13Y, 13C and 13M that are optical systems.

Figure 2:
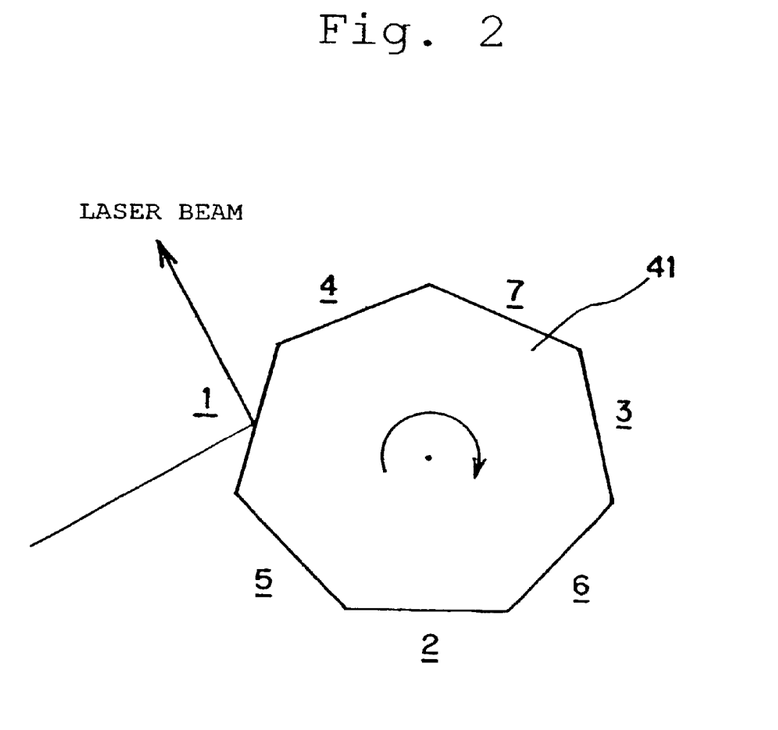
FIG. 2 is a structural view of a polygon mirror 41 that is used in the image forming apparatus shown in FIG. 1.

In this way, as shown in FIG. 2, for example, when a process speed is reduced to half, if thinning-out scanning is performed for every one surface in the order of 1 to 7 in a polygon mirror 41, a period until the identical surface appears can be made seven (1→3→5→7→2→4→6→1) FIG. 2 is a structural view of the polygon mirror 41, which is used in the image forming apparatus shown in FIG. 1.

As a result, a period of undulation of scanning lines can avoid being shortened by thinning-out scanning and deterioration of an interference fringe can be prevented.

(Generalization)

The above description of this embodiment is generalized as follows. That is, in general, when it is assumed that the number of surfaces of a polygon mirror is m (provided that m is an integer of three or more) and a deceleration ratio by thinning-out scanning for n surfaces is 1/(n+1) (e.g., each scanning is performed by thinning out every other surface, a speed at the time of deceleration (decelerating image forming process) is 1/(n+1) ½), m/(n+1) is adjusted not to be an integer. (n is a natural number.)

That is, deterioration of an interference fringe at the time of deceleration can be prevented by adjusting a relation between m and n such that m/(n+1)≠integer is satisfied.

That is, the image forming method in the image forming apparatus of this embodiment has a step of switching from the first mode for forming an image on an image bearing member at the first speed to the second mode for forming an image on the image bearing member at a speed lower than the first speed and a step of using reflective surfaces of a rotatable reflective polyhedron, in which the number of surfaces for reflecting light from a light source and optically scanning an image bearing member is m, to scan optically by skipping n surfaces such that m/(n+1) does not make an integer (provided that m is an integer of three or more and n is a natural number).

However, if m/(n+1) is adjusted not to be an integer, it is more favorable to adjust m/(n+1) to be indivisible.

For example, deterioration of an interference fringe can be prevented by thinning-out one, two and three surfaces respectively according to the deceleration ratios of half, one third and one quarter if polygon mirrors of eleven, seven or five surfaces is used.

In addition, other than the above-mentioned embodiment, deterioration of an interference fringe can be prevented by, for example, thinning-out two surfaces respectively according to the deceleration ratio of one third if polygon mirrors of ten surfaces is used.

In addition, other than the above-mentioned embodiment, deterioration of an interference fringe can be prevented by, for example, thinning-out two and four surfaces respectively according to the deceleration ratio of one third and one fifth if polygon mirrors of eight surfaces is used.

In addition, other than the above-mentioned embodiment, deterioration of an interference fringe can be prevented by, for example, thinning-out two surfaces respectively according to the deceleration ratio of one third if polygon mirrors of four surfaces is used.

Further, as timing for starting deceleration of a process speed, in the case of the four-drum system as in this example, all speeds may be put in a decelerated state in advance prior to supplying the sheet material P. In addition, if there is a device for automatically detecting an OHP sheet (OHP paper) and the like, an image may be formed by changing a process speed to a decelerated state after the sheet material P is supplied to the registration roller 20 at a normal speed and stopped temporarily and, then, it is detected by a detecting device 22 that the sheet material P is, for example, an OHP sheet (transparent).

In this way, automatic detection of special paper such as an OHP sheet can be realized and throughput can be maximized.

Further, it is needless to mention that, in the above-mentioned example, at the time of reducing a fixing speed to 1/(n+1), n surfaces of a polygon mirror is thinned out, whereby it is sufficient to output image signals 23M to 23Bk without changing a basic clocks of the image signals, therefore by thinning out the image signals themselves by n lines for each (n+1) line. Thus, load applied to a controller can be reduced.

As described above, this embodiment is for providing a plurality of exposing means, reflective polyhedrons and image bearing members to form toner images of different colors, respectively. Therefore, the above-mentioned deficiencies of an image at the time of deceleration of a color image forming apparatus by the tandem type multiple transfer method can be prevented.

[Second Embodiment]

Figure 3:
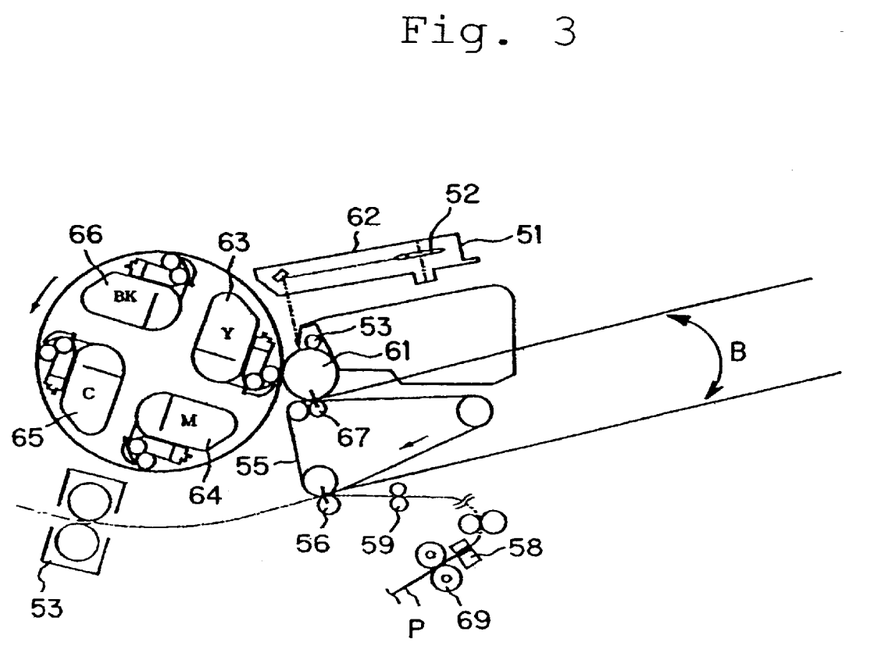
FIG. 3 is a sectional view of a full color image forming apparatus by an intermediate transfer member method with one drum four developing devices of an electrophotographic method that is a second embodiment of the image forming apparatus in accordance with the present invention.

A second embodiment of the image forming apparatus in accordance with the present invention will be described with reference to FIG. 3. FIG. 3 is a sectional view of a full color image forming apparatus by an intermediate transfer member method with one drum and four developing devices of an electrophotographic system, which is the second embodiment of the image forming apparatus in accordance with the present invention.

In FIG. 3, reference numeral 62 denotes a laser exposure device as exposing means having inside a polygon mirror 52 as a reflective polyhedron being an element of the present invention. The laser exposure device 62 exposes the surface of a photosensitive drum 61 as an image bearing member, which is uniformly charged by primary charging means 53, in accordance with an image signal 51.

Reference numeral 63, 64, 65 and 66 denotes developing devices of a rotary type that rotate in an arrow direction one after another to develop the photosensitive drum 61. Reference numeral 55 denotes an intermediate transfer belt as intermediate transferring means that superimposes each image of Y, M, C and Bk one after another on its surface to bear the images.

Reference numeral 67 is a primary transferring device from the photosensitive drum 61 to the intermediate transfer belt 55. Reference numeral 56 denotes a secondary transferring device for collectively transferring images on the intermediate transfer belt 55 to the sheet material P, which is supplied to the position between the secondary transferring device 56 and the intermediate transfer belt 55 via a sheet supplying roller 69, a registration roller 59 and the like.

The sheet material P having the images collectively transferred to its surface is subject to heating and fixing by the fixing device 53 as fixing means being an element of the present invention.

In the embodiment as described above, there is a case in which a distance B between a primary transfer nip and a secondary transfer nip is smaller than a maximum paper size of paper that is an object of printing in a decelerated state. In this case, it is preferable to perform at least image formation and primary transfer of a final color (Bk in this case) in a decelerated state in advance, or to cause the intermediate transfer belt 55 to turn idly once more after primary transfer of a final color is finished and cause at least the intermediate transfer belt 55 and the secondary transferring device 56 to decelerate during this idle turning and, thereafter perform decelerated fixing by the fixing device 53.

Naturally, since throughput is decreased with the latter method, it is favorable to decelerate a process speed after primary transfer of a third color and before primary transfer of a fourth color with the former method in order to obtain maximum throughput.

In such a case, when it is assumed that the number of surfaces of the polygon mirror 52 is m and a deceleration ratio by thinning-out scanning for n surfaces is 1/(n+1), m/(n+1) is adjusted not to be an integer, that is, m/(n+1) ≠integer, whereby deterioration of an interference fringe at the time of deceleration of the fourth color can also be prevented.

However, if m/(n+1) is adjusted not to be an integer, it is more favorable to adjust m/(n+1) to be indivisible.

For example, deterioration of an interference fringe can be prevented by thinning-out one, two and three surfaces respectively according to the deceleration ratios of half, one third and one quarter if polygon mirrors of eleven, seven or five surfaces is used.

In addition, other than the above-mentioned embodiment, deterioration of an interference fringe can be prevented by, for example, thinning-out two surfaces respectively according to the deceleration ratio of one third if polygon mirrors of ten surfaces is used.

In addition, other than the above-mentioned embodiment, deterioration of an interference fringe can be prevented by, for example, thinning-out two and four surfaces respectively according to the deceleration ratio of one third and one fifth if polygon mirrors of eight surfaces is used.

In addition, other than the above-mentioned embodiment, deterioration of an interference fringe can be prevented by, for example, thinning-out two surfaces respectively according to the deceleration ratio of one third if polygon mirrors of four surfaces is used.

In addition, since a toner image is transferred to a sheet material using intermediate transferring means, miniaturization and cost reduction in an apparatus can be realized.

Further, in this second embodiment, if a device for detecting a sheet material 58 or the like as detecting means is used as described in the first embodiment, a type of a sheet material after it is supplied can be automatically detected and, if it is an OHP sheet, the image forming apparatus can enter a deceleration mode of half or one third after image formation and primary transfer of first to third colors are finished and before image formation of a fourth color.

Further, the case in which the intermediate transfer belt 55 is used as an intermediate transfer member is described in this example, it is need less to mention that the description is also applied to a case in which an intermediate transfer drum or the like is used.

[Third Embodiment]

In the second embodiment, the case of the intermediate transfer method using the intermediate transfer belt 55 is described. In a multiple transfer method for sequentially developing latent images on an only photosensitive drum to transfer the latent images to a sheet material each time they are developed, if a distance between a transfer unit and a fixing unit is shorter than a length of a maximum sheet material, it is also preferable to reduce a process speed after image formation of a third color is finished and before image formation of a fourth color in order to increase throughput at the time when decelerated fixing is executed.

In such a case, as in the second embodiment, when it is assumed that the number of surfaces of the polygon mirror 52 as a reflective polyhedron is m and a deceleration ratio by thinning-out scanning for to n surfaces is $1/(n+1)$, $m/(n+1)$ is adjusted not to be an integer, that is, $m/(n+1) \neq$ integer, whereby deterioration of an interference fringe at the time of deceleration of the fourth color can also be prevented.

For example, deterioration of an interference fringe can be prevented by thinning-out one, two and three surfaces respectively according to the deceleration ratios of half, one third and one quarter if polygon mirrors of eleven, seven or five surfaces is used.

In addition, other than the above-mentioned embodiment, deterioration of an interference fringe can be prevented by, for example, thinning-out two surfaces respectively according to the deceleration ratio of one third if polygon mirrors of ten surfaces is used.

In addition, other than the above-mentioned embodiment, deterioration of an interference fringe can be prevented by, for example, thinning-out two and four surfaces respectively according to the deceleration ratio of one third and one fifth if polygon mirrors of eight surfaces is used.

In addition, other than the above-mentioned embodiment, deterioration of an interference fringe can be prevented by, for example, thinning-out two surfaces respectively according to the deceleration ratio of one third if polygon mirrors of four surfaces is used.

As described above, according to the present invention, in a decelerated image forming process for reducing an operation speed of an image bearing member and fixing means to $1/(n+1)$ of an operation speed of the image bearing member and the fixing means in case of a standard image forming speed, if the number of surfaces of a reflective polyhedron is m (provided that m is an integer of three or more), control means performs control for selecting n (integer) such that $m/(n+1)$ does not make an integer as a relation between m and n and, at the same time, performs control for making n surfaces unused as a reflective surface of light among continuous n+1 surfaces of a reflective polyhedron. As a result, for example, if the number of reflective surfaces of the reflective polyhedron is seven and an operation speed is made ½, an order of the reflective surfaces becomes 1, 3, 5, 7, 2, 4, 6, 1, 3 . . . , whereby a period of deviation in the scanning direction can be prevented from becoming short and the above-mentioned deficiencies of an image at the time of deceleration can be prevented.

Here, making n surfaces unused as a reflective surface of light among continuous n+1 surfaces of a reflective polyhedron means that, for example, if a polygon mirror of seven surfaces is used as a reflective polyhedron and n=2, each surface of this polygon mirror is ordered as 1, 2, 3, 4, 5, 6 and 7 and two surfaces out of three surfaces are made unused continuously as a reflective surface.

That is, in the above example, this means selecting the reflective surfaces in the order of 1, 4, 7, 3, 6, 2, 5, 1, 4, 7 . . . . This is the same for a reflective polyhedron of other numbers of surfaces and an arbitrary n.

Thus, it is seen that an image forming apparatus and an image forming method are provided. One skilled in the art will appreciate that the present invention can be practiced by other than the preferred embodiments which are presented for the purposes of illustration and not of limitation, and the present invention can be modified in any way within the technical thoughts of the present invention.

What is claimed is:

1. An image forming apparatus comprising:
   a movable image bearing member;
   a light source;
   a rotatable reflective polyhedron for reflecting light from said light source and performing light scanning of said image bearing member, wherein a plurality of light scannings are performed for a plurality of colors, respectively, in accordance with the following modes:
   a first mode for forming an image on said image bearing member at a first speed; and
   a second mode for forming an image on said image bearing member at a second speed, which is $1/(n+1)$ of the first speed,
   wherein at the time of performing the second mode, in each of said plurality of light scannings, when it is assumed that the number of reflective surfaces of said reflective polyhedron is m, $m/(n+1)$ is not an integer (provided that m is an integer of three or more and n is a natural number.).

2. An image forming apparatus according to claim 1, wherein a n+1th reflective surface of said reflective polyhedron in which n surfaces are skipped as a reflective surface used for light scanning are used for a subsequent light scanning at a time of executing the second mode.

3. An image forming apparatus according to claim 1, further comprising movable fixing means for fixing a toner image on a recording material to which the toner image formed on said image bearing member is transferred while conveying the recording material,
   wherein a moving speed at a time of performing the second mode of said image bearing member and said fixing means is $1/(n+1)$ of a moving speed of a time of performing the first mode.

4. An image forming apparatus according to claim 3, wherein, if the recording material is one of a recording material having translucency, a relatively thick recording material, and a recording material for improving a glossiness of an image, the said second mode is performed.

5. An image forming apparatus according to claim 3, further comprising detecting means for detecting a type of a recording material,
   wherein a timing for performing the second mode is determined based on a detection result of said detecting means.

6. An image forming apparatus according to claim 1,
   wherein said image bearing member is provided in a plurality corresponding to a number of images of different colors.

7. An image forming apparatus according to claim 1, further comprising an intermediate transfer member, wherein an image on said image bearing member is transferred to said intermediate transfer member.

8. An image forming method comprising the steps of:
   switching from a first mode for forming an image on an image bearing member at a first speed to a second mode for forming an image on an image bearing member at a speed, which is lower than the first speed; and
   in each of a plurality of light scannings performed, respectively, for a plurality of colors, using reflective surfaces of a rotatable reflective polyhedron, in which a number of reflective surfaces is m, for reflecting light from a light source, performing light scanning to an image bearing member by skipping n surfaces, such that $m/(n+1)$ is not an integer (provided that m is an integer of three or more and n is a natural number.).

* * * * *

UNITED STATES PATENT AND TRADEMARK OFFICE
CERTIFICATE OF CORRECTION

PATENT NO.   : 6,639,616 B2
DATED        : October 28, 2003
INVENTOR(S)  : Akihiko Takeuchi et al.

It is certified that error appears in the above-identified patent and that said Letters Patent is hereby corrected as shown below:

Column 1,
Line 29, "to" should read -- to as --.

Column 2,
Line 45, "extended" should read -- extended. --; and
Line 59, "additionally.)" should read -- additionally). --.

Column 3,
Line 49, "as a" should read -- as an --.

Column 6,
Line 5, "drum" should read -- drum and --.

Column 8,
Line 36, "6→1)," should read -- 6→1). --; and
Line 51, "1/(n+1) ½)," should read -- 1/(n+1) = ½), --.

Column 9,
Line 42, "a" should be deleted.

Column 12,
Line 48, "number.)." should read -- number). --

Column 13,
Line 2, "said" should be deleted.

UNITED STATES PATENT AND TRADEMARK OFFICE
CERTIFICATE OF CORRECTION

PATENT NO.   : 6,639,616 B2
DATED        : October 28, 2003
INVENTOR(S)  : Akihiko Takeuchi et al.

It is certified that error appears in the above-identified patent and that said Letters Patent is hereby corrected as shown below:

Column 14,
Line 15, "number.)." should read -- number). --.

Signed and Sealed this

Nineteenth Day of October, 2004

JON W. DUDAS
*Director of the United States Patent and Trademark Office*